(12) United States Patent
Iinuma et al.

(10) Patent No.: US 6,230,325 B1
(45) Date of Patent: *May 8, 2001

(54) INFORMATION NETWORK SYSTEM MAKING USE OF TELEVISION OR RADIO BROADCASTING AND BROADCAST RECEIVING USER TERMINAL

(75) Inventors: Kazumoto Iinuma, Tokyo; Takanori Sashida, Abiko, both of (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,819

(22) Filed: Oct. 2, 1996

(30) Foreign Application Priority Data

Oct. 5, 1995 (JP) .................................................. 7-258699
Nov. 15, 1995 (JP) .................................................. 7-296568

(51) Int. Cl.$^7$ ..................................................... H04N 7/173
(52) U.S. Cl. ........................... 725/110; 725/112; 725/133; 725/134
(58) Field of Search ................................. 348/7, 13, 12, 348/906; 455/4.2, 5.1; 345/327; 395/200.49; 725/135, 138, 139, 141, 142, 109, 110–113, 131, 133, 134

(56) References Cited

U.S. PATENT DOCUMENTS

| 5,438,355 | 8/1995 | Palmer | 348/1 |
| 5,570,295 | * 10/1996 | Isenberg et al. | 379/90.01 |
| 5,640,193 | * 6/1997 | Wellner | 348/7 |
| 5,761,602 | * 6/1998 | Wagner et al. | 348/12 |

FOREIGN PATENT DOCUMENTS

| 2 309 853 | 8/1997 | (GB) . |
| 60-148290 | 8/1985 | (JP) . |

(List continued on next page.)

OTHER PUBLICATIONS

Order No. 77 of the Ministry of Posts and Telecommunications of Japan, issued Oct. 15, 1985.
*Nikkei Electronics*, No. 638, Jun. 19, 1995, p. 140.

(List continued on next page.)

*Primary Examiner*—John W. Miller
(74) *Attorney, Agent, or Firm*—Sughrue, Mion, Zinn, Macpeak & Seas, PLLC

(57) ABSTRACT

The invention provides an information network system and a broadcasting receiving user terminal by which bidirectional communication can be established between a user terminal and a data base center and between the data base center and a broadcasting station so that a user can enjoy a service provided from the data base center and enjoy bidirectional communication in regard to broadcasting. The information network system includes a broadcasting receiver, a user terminal, and a data base center connected to the user terminal by a network. The broadcasting center includes a guide information addition section which adds data base accessing guide information to a broadcasting signal for a program to be transmitted. The user terminal includes a guide information extraction section which extracts the guide information from the broadcasting signal, and a network communication section which accesses a data base of the data base center via the network based on the extracted guide information and user information peculiar to a user of the user terminal and receives a response from the data base center. The data base center includes another network communication section which confirms the guide information and the user information received from the user terminal via the network and then establishes bidirectional communication with the user terminal.

15 Claims, 17 Drawing Sheets

FOREIGN PATENT DOCUMENTS

| | | |
|---|---|---|
| 62-38964 | 2/1987 | (JP) . |
| 62-120768 | 6/1987 | (JP) . |
| 63-90262 | 4/1988 | (JP) . |
| 4-127688 | 4/1992 | (JP) . |
| 4-339420 | 11/1992 | (JP) . |
| 7-59073 | 3/1995 | (JP) . |
| 7-79425 | 3/1995 | (JP) . |
| 7-123395 | 5/1995 | (JP) . |
| 3014927 | 6/1995 | (JP) . |
| 7-235912 | 9/1995 | (JP) . |
| 9-98403 | 4/1997 | (JP) . |
| 9-98411 | 4/1997 | (JP) . |

OTHER PUBLICATIONS

Order No. 51 of the Ministry of Posts and Telecommunications of Japan, issued Jul. 4, 1995.

*Journal of the Television Society of Japan*, vol. 48, No. 1, 1994, pp. 57–64.

Order No. 30 of the Ministry of Posts and Telecommunications of Japan, issued Apr. 28, 1994.

*EBU—Technical*, No. 200, Aug. 1983, pp. 186–192.

H.R. Anderson et al., "A Technique for Digital Information Broadcasting Using SCA Channels", *IEEE Transactions on Broadcasting*, vol. BC–27, No. 4, Dec. 1981, pp. 65–70.

M.J. Garr et al., "Data Broadcasting in the USA Low Cost Delivery Alternative and More", *IEEE Transactions on Consumer Electronics*, vol. 36,, No. 4, Nov. 1990, pp. 877–884.

*Journal of the Television Society of Japan*, vol. 48, No. 2, 1994, pp. 164–170.

* cited by examiner

FIG. 10 (a)

GUIDE INFORMATION

| | |
|---|---|
| BROADCASTING PROGRAM ID | : 123456 |
| DATA BASE CENTER TELEPHONE NUMBER | : 03-444-5555 |
| DATA BASE SERVER ID | : http://WWW.abc.or.jp |

FIG. 10 (b)

USER INFORMATION

| | |
|---|---|
| NAME : | ○○○○ |
| ADDRESS : | △△△△ |
| USER ID : | XYZ98765 |
| PASSWORD : | ＊＊＊＊ |

FIG. 10 (c)

COMMUNICATION INFORMATION

THANK YOU FOR YOUR ENJOYMENT OF ABC SHOPPING. THE FOLLOWING TWO COMMODITIES ARE AVAILABLE.
1. ○○○○
2. △△△△

PLEASE DESIGNATE COMMODITY NUMBER: 1

PLEASE SELECT METHOD OF PAYMENT: 2

1. CREDIT X   2. CREDIT Y   3. CREDIT Z

PLEASE INPUT CREDIT NUMBER: 0001235678

YOUR ORDER HAS BEEN ACCEPTED. THE COMMODITIES WILL BE FORWARDED BEFORE THE DATE OF XXXXX.

INFORMATION NETWORK SYSTEM MAKING USE OF TELEVISION OR RADIO BROADCASTING AND BROADCAST RECEIVING USER TERMINAL

BACKGROUND OF THE INVENTION

1. Field of the Invention

This invention relates to an information network system which makes use of television broadcasting or radio broadcasting and a broadcast receiving user terminal.

2. Description of the Related Art

Conventional television receivers merely display an image and reproduce sound transmitted from a broadcasting station by wireless or by means of a cable, and usually allow information communication with users only in one direction. When a user intends to make use of a television shopping service guided in a broadcasting program, the user will telephone a service center which provides the service. However, it is cumbersome to the user in that the user must take a memo of a telephone number, and the telephone system is liable to become busy. On the service center side, responses to individual users who telephone the service center are performed manually and sufficient information cannot be acquired in a short time.

A television receiver with a bidirectional communication function which includes a communication control circuit which allows bidirectional communication with a broadcasting station is proposed in Japanese Patent Laid-Open Application No. Heisei 7-79425. With the television receiver, however, a user can communicate only with a broadcasting station, and the method of utilizing it is limited significantly. On the other hand, in a shopping data base service which makes use of personal computer communication, many cumbersome operations are involved such as operations for confirmation of the address of a data base center, assurance of an accessing method and checking of whether or not contents of a service satisfy the user. Consequently, the general public cannot utilize the shopping data base service readily.

In this manner, the television broadcasting at present presumes one directional communication and does not allow bidirectional information interchange with a service provider which makes use of television broadcasting. This similarly applies to radio broadcasting.

SUMMARY OF THE INVENTION

It is an object of the present invention to provide an information network system and a broadcasting receiving user terminal by which bidirectional communication can be established between a user terminal and a data base center so that a user can enjoy a service provided from the data base center.

It is another object of the present invention to provide an information network system and a broadcasting receiving user terminal by which a response path from a user terminal to a broadcasting center can be established via a network and a data base center to allow bidirectionality to be provided to broadcasting which has conventionally been communicated in one direction from the broadcasting center to the user terminal.

In order to attain the objects described above, according to an aspect of the present invention, there is provided an information network system, comprising a broadcasting center for transmitting a broadcasting signal, a user terminal for receiving the broadcasting signal from the broadcasting center, a data base center connected to the user terminal by a network, guide information addition means provided in the broadcasting center for adding data base accessing guide information to the broadcasting signal for a program to be transmitted, guide information extraction means provided in the user terminal for extracting the guide information from the broadcasting signal received by the user terminal, first network communication means provided in the user terminal for accessing a data base of the data base center via the network based on the guide information extracted by the guide information extraction means and user information peculiar to a user of the user terminal and for receiving a response from the data base center, and second network communication means provided in the data base center for confirming the guide information and the user information transmitted thereto from the user terminal via the network and then establishing bidirectional communication with the user terminal.

Where the broadcasting signal from the broadcasting center is an analog television broadcasting signal, the guide information addition means inserts the guide information into a blanking period of a television video signal of the analog television broadcasting signal, and the user terminal is a user terminal for receiving the analog television broadcasting signal and the guide information extraction means in the user terminal extracts the guide information from the blanking period of the television signal received by the user terminal.

Where the broadcasting signal from the broadcasting center is a digital television broadcasting signal, the guide information addition means superimposes the guide information with the digital television broadcasting signal, and the user terminal is a user terminal for receiving the digital television broadcasting signal and the guide information extraction means in the user terminal extracts and decodes the guide information from the digital television broadcasting signal received by the user terminal.

Where the broadcasting signal from the broadcasting center is an analog radio broadcasting signal, the guide information addition means transmits the guide information in synchronism with the analog radio broadcasting signal, and the user terminal is a user terminal for receiving the analog radio broadcasting signal and the guide information extraction means in the user terminal extracts the guide information in synchronism with the analog radio broadcasting signal received by the user terminal.

Where the broadcasting signal from the broadcasting center is a digital radio broadcasting signal, the guide information addition means multiplexes the guide information with the digital radio broadcasting signal, and the user terminal is a user terminal for receiving the digital radio broadcasting signal and the guide information extraction means in the user terminal extracts the guide information from the digital radio broadcasting signal received by the user terminal.

The guide information may include information for allowing automatic dialing and automatic log-in to the data base center.

Preferably, the network is the internet, and the guide information includes a universal resource locator for a data base center. The guide information may further include information for automatic dialing to the data base center or information for identification of a program from the broadcasting center.

With the information network system, a user of the broadcasting receiving user terminal for receiving television broadcasting or radio broadcasting can realize bidirectional communication readily with the data base center under the guidance broadcast in a broadcasting program and can thus enjoy various services making use of the network. Meanwhile, the service providing side can acquire information from users efficiently by bidirectional communication with the users.

According to another aspect of the present invention, there is provided a broadcasting receiving user terminal for receiving a broadcasting signal from a broadcasting center, comprising guide information extraction means for extracting, from the broadcasting signal received by the user terminal, data base accessing guide information added to the broadcasting signal for a program, storage means for storing user information peculiar to a user of the user terminal, and network communication means for transmitting the user information read out from the storage means and the data base accessing information obtained from the guide information extracted by the guide information extraction means to a data base center via a network and for receiving a response from the data base center.

Where the user terminal is an analog television signal receiving user terminal for receiving an analog television broadcasting signal from the broadcasting center, the guide information extraction means extracts the guide information from a blanking period of the analog television broadcasting signal received by the user terminal.

Where the user terminal is a digital television broadcasting signal receiving user terminal for receiving a digital television broadcasting signal from the broadcasting center, the guide information extraction means extracts and decodes the guide information from the digital television broadcasting signal received by the user terminal.

Where the user terminal is an analog radio broadcasting signal receiving user terminal for receiving an analog radio broadcasting signal from the broadcasting center, the guide information extraction means extracts the guide information in synchronism with the analog radio broadcasting signal received by the user terminal.

Where the user terminal is a digital radio broadcasting signal receiving user terminal for receiving a digital radio broadcasting signal from the broadcasting station, the guide information extraction means extracts the guide information from the digital radio broadcasting signal received by the user terminal.

With the user terminal which performs bidirectional communication with the data base center, where it receives a television broadcasting signal, the user terminal can be provided at a low cost as an apparatus which is easy to use by applying a television receiver with a teletext receiving function or a personal computer with a television receiving function, but where it receives a radio broadcasting signal, the user terminal can be provided at a low cost as an apparatus which is easy to use by combination of a car-carried radio and a mobile telephone or navigator technique.

The above and other objects, features and advantages of the present invention will become apparent from the following description and the appended claims, taken in conjunction with the accompanying drawings in which like parts or elements are denoted by like reference characters.

DESCRIPTION OF THE DRAWINGS

FIGS. 10(*a*), 10(*b*) and 10(*c*) are schematic views showing examples of display of guide information, user information and information from the data base center to be displayed on a display unit of the user terminal in the information network system of FIG. 1, respectively;

DESCRIPTION OF THE PREFERRED EMBODIMENTS

Figure 1:
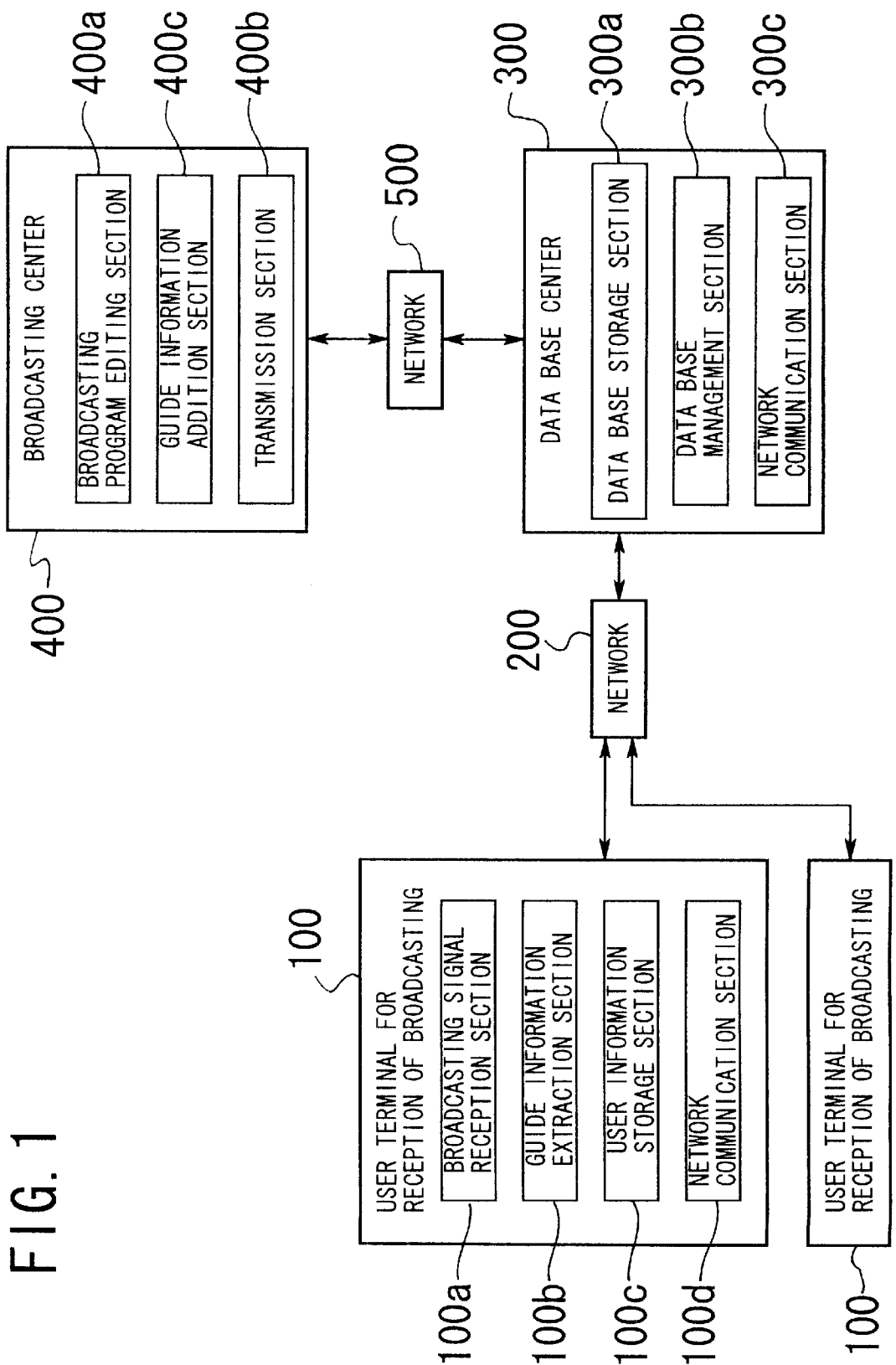
FIG. 1 is a block diagram showing a basic construction of an information network system to which the present invention is applied.

Referring first to FIG. 1, there is shown a basic construction of an information network system to which the present invention is applied. The information network system shown includes a broadcasting center 400 for providing broadcasting programs to users, a data base center 300 for providing data bases to users, and a large number of broadcasting receiving user terminals 100 (only two are shown in FIG. 1) having a function of receiving a broadcasting program from the broadcasting center 400 and another function of bidirectionally communicating with the data base center 300 via a network 200. Also the broadcasting center 400 and the data base center 300 are connected to each other by a network 500 which allows bidirectional communication so that they can communicate with each other.

The broadcasting center 400 includes a broadcasting program editing section 400*a* for editing a broadcasting program, a transmission section 400*b* for transmitting a broadcasting signal of the edited broadcasting program by wireless or by a cable, and a guide information addition section 400*c* for adding guide information for accessing to a data base to a broadcasting signal for a particular program to be transmitted from the transmission section 400b. The guide information may include a broadcasting program ID (identification number or code) for identifying the broadcasting program, a telephone number of the data base center 300, and a data base server ID for designating a data base to be addressed.

The data base center 300 includes a data base storage section 300a, a data base management section 300b for managing the data base storage section 300a, and a network communication section 300c for bidirectionally communicating with the large number of user terminals 100 via the network 200.

Each of the user terminals 100 includes a broadcasting signal reception section 100a for receiving a broadcasting signal transmitted by wireless or by a cable from the broadcasting center 400, a guide information extraction section 100b for separating and extracting, from the received broadcasting signal, guide information added to the broadcasting signal by the broadcasting center 400, a user information storage section 100c for storing user information peculiar to a user of the user terminal 100, and a network communication section 100d for accessing a data base of the data base center 300 via the network 200 based on the guide information extracted by the guide information extraction section 100b and the user information read out from the user information storage section 100c and for receiving a response from the data base center 300. The user information may include the name, an address, a user ID, a password and so forth of the user.

The basic construction of the information network system shown in FIG. 1 can be applied to any broadcasting form from among analog television broadcasting, digital television broadcasting, analog radio broadcasting and digital radio broadcasting.

Figure 2:
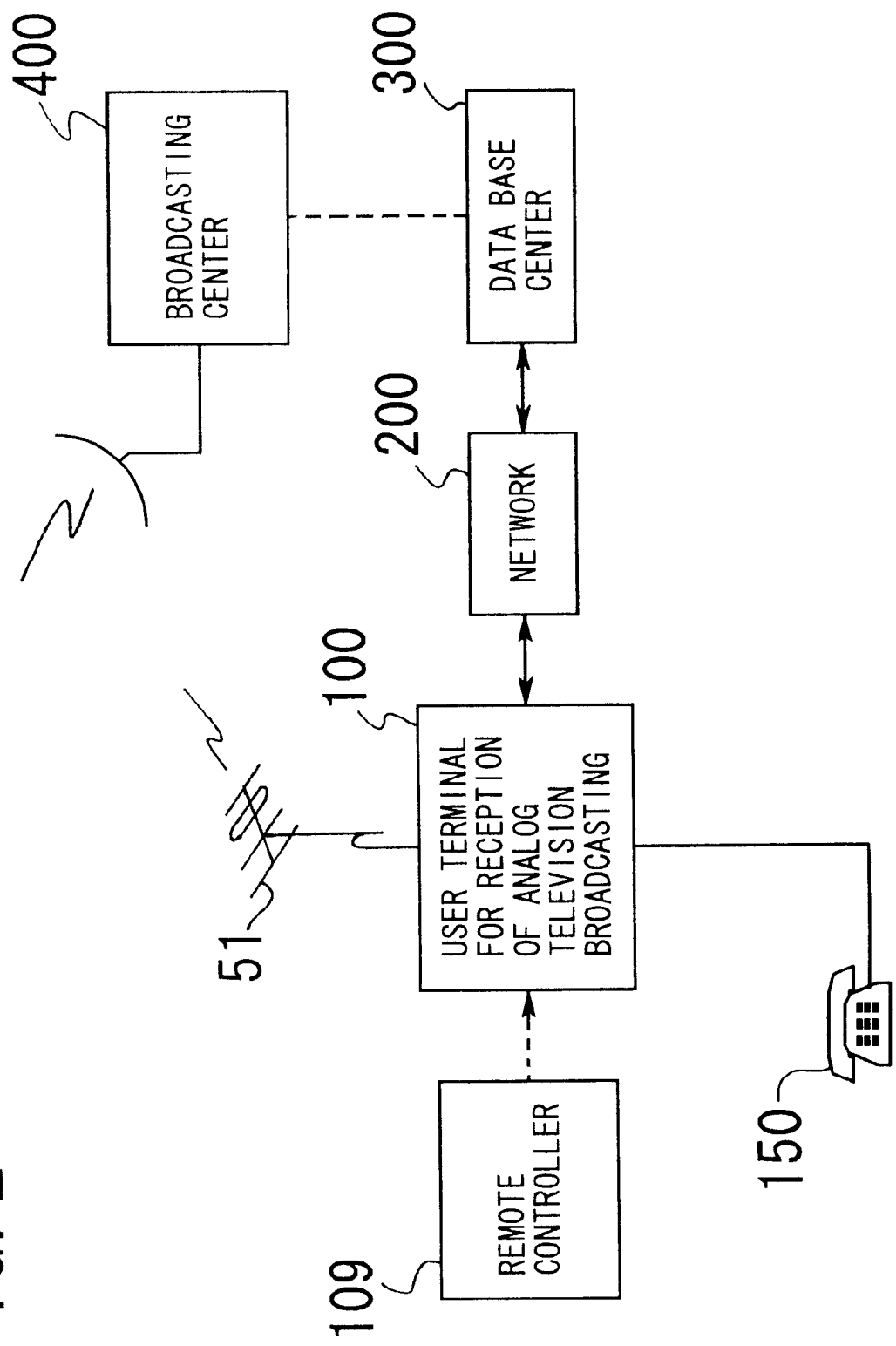
FIG. 2 is a block diagram of the information network system of FIG. 1 when it is applied to analog television broadcasting.

FIG. 2 shows a system construction of an information network system wherein the basic construction of FIG. 1 is applied to analog television broadcasting. In this instance, since the broadcasting signal from the broadcasting center 400 is an analog television broadcasting signal, each of the user terminals 100 is formed as a user terminal for receiving the analog television broadcasting signal. In the broadcasting center 400, a guide image and/or sound for calling a user's attention to accessing to a data base is inserted into a broadcasting program which expects reactions of viewers such as a broadcasting program for shopping, a quiz or questionnaire, and guide information including a broadcasting program ID, a telephone number of the data base center, the data base server ID and so forth is transmitted in synchronism with the television broadcasting signal of the broadcasting program. Here, the broadcasting program may be an ordinary television broadcasting program (a drama, a sport game or the like) or a commercial program.

As a method of transmitting guide information in synchronism with a television broadcasting signal, part of a blanking period of the television broadcasting signal may be used. More particularly, guide information is transmitted in place of character transmission of teletext defined by the Order No. 77 of the Ministry of Posts and Telecommunications of Japan issued on Oct. 15, 1985, or part of an identification signal multiplexed in two vertical blanking scanning lines, that is, the 22nd and 28th vertical blanking scanning lines, of the EDTV-II system (explained, for example, in *Nikkei Electronics*, No. 638, Jun. 19, 1995, p.140) which is the second generation EDTV system defined in the Order No. 51 of the Ministry of Posts and Telecommunications of Japan issued on Jul. 4, 1995 may be used. For example, if the undefined bits 15 and 16 of the EDTV-II system are used, then since 4 bits can be used for one frame, a data signal of 120 bits can be transmitted per second. Since a television broadcasting program continues for 15 seconds at the shortest, digital data of totalling 1,800 bits can be transmitted as guide information within the period of 15 seconds. Consequently, guide information can be transmitted sufficiently including an error correction function.

Each user will manually operate its user terminal 100 using a remote controller 109 similarly to an ordinary television receiver, and controls information to be transmitted to the data base center 300. If the user terminal 100 is put into a communication mode, then the user terminal 100 can automatically dial to and automatically log in the data base center 300 using extracted guide information, and it can bidirectionally communicate with the data base center 300 via the network 200. A telephone set 150 can be connected to the user terminal 100. For the network 200, a commercial line by wireless or by a cable such as a bidirectional cable network such as an ordinary telephone line, an ISDN line or a CATV network or a wireless network such as a satellite communication line or a mobile radio communication system is suitably used to perform communication making use of the internet. However, personal computer communication or direct communication which makes use of a dedicated line for the data base center 300 may otherwise be utilized.

Figure 3:
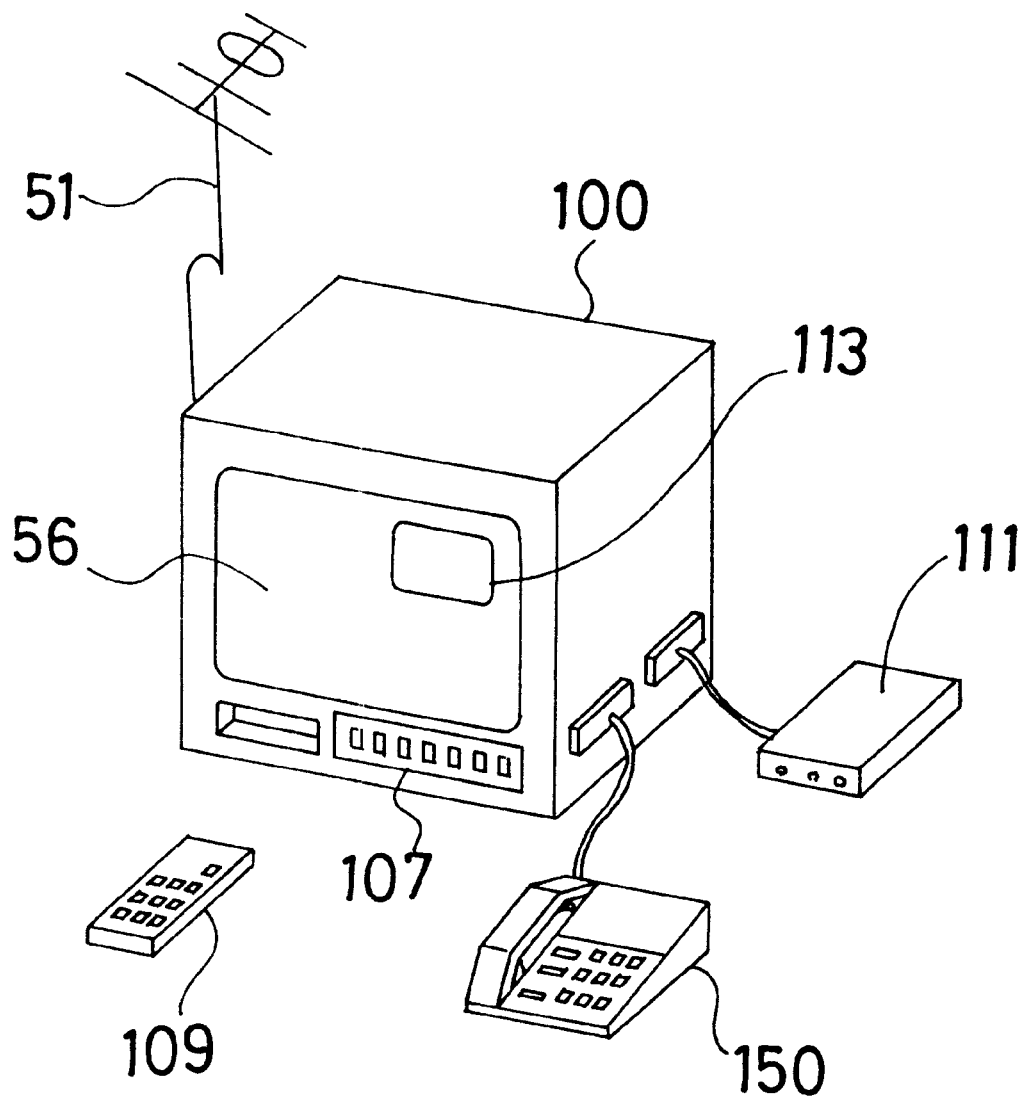
FIG. 3 is a perspective view showing an appearance of a user terminal for reception of analog television broadcasting employed in the information network system shown in FIG. 2.

FIG. 3 shows an appearance of an exemplary one of the user terminals 100 for reception of analog television broadcasting. The user terminal 100 shown has, in addition to functions of an ordinary television receiver which receives an analog television broadcasting signal from the broadcasting center 400 via an antenna 51, a guide information extraction function, a user information storage function and a network communication function. The user terminal 100 performs network communication using a modem 111. If the user terminal 100 is put into a communication mode, then a window 113 is opened on a display unit 56, and guide information, user information, communication information with the data base center and so forth are displayed in the window 113.

Figure 4:
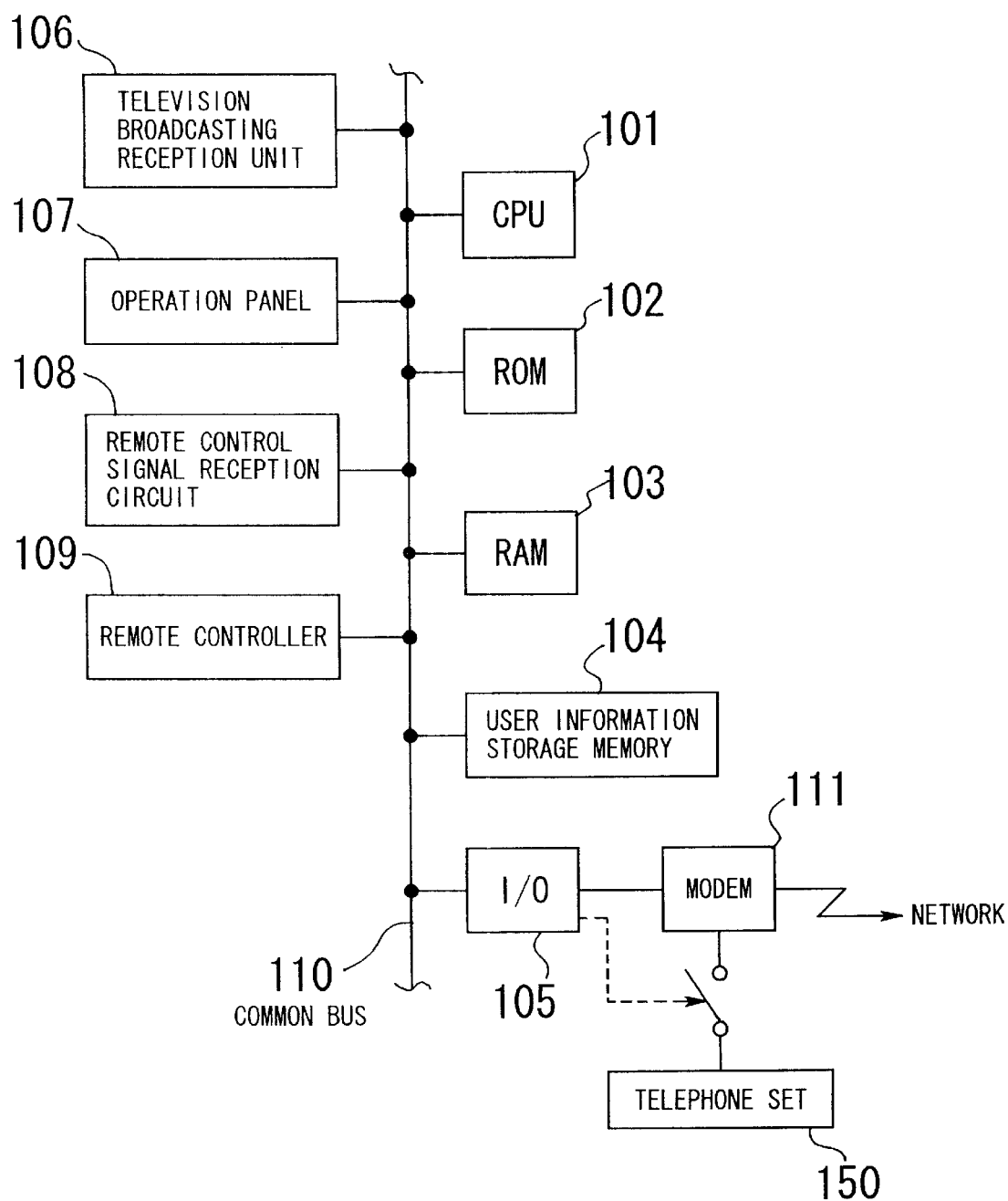
FIG. 4 is a block diagram showing a circuit construction of the user terminal shown in FIG. 3.

FIG. 4 shows a circuit construction of the user terminal 100. Referring to FIG. 4, the user terminal 100 shown includes a television broadcasting reception unit 106, an operation panel 107, a remote control signal reception circuit 108, a CPU 101, a read only memory (ROM) 102, a random access memory (RAM) 103, a user information storage memory 104, and an input/output interface 105 for communication all connected to a common bus 110.

The CPU 101 controls the entire user terminal 100 in accordance with a system program stored in the ROM 102. It is to be noted that information communicated between the circuit elements connected to the common bus 110 is read out from a transmission side circuit and written into a reception side circuit by the CPU 101. Further, the CPU 101 performs such communication control as hereinafter described.

The ROM 102 stores in advance, in addition to the system program to be executed by the CPU 101, data to be used for execution of the system program, character code trains to be used as, for example, display messages, and a font conversion table for conversion of character codes into character patterns. The RAM 103 temporarily stores input data, output data and a result of calculation of the CPU 101.

The user information storage memory 104 stores user information peculiar to the user of the user terminal 100. The user information may include a user ID (identification code), the name, an address, a telephone number and so forth. The user information may further include the sex, the date of birth, the nationality, the occupation and a blood type of the user, which may be suitably used in accordance with an object of the utilization. The user ID is used for verification with a password inputted by the user and for transmission to a destination of communication. The user information storage memory 104 may be suitably selected from a non-volatile semiconductor memory (programmable memory, flash memory, ferroelectric memory or the like), an IC card, a magnetic storage card, an optical storage card, a magnetic recording disk, an optical recording disk and so forth in accordance with an application. Where a removable card is used, since the user information can be stored separately from the user terminal 100, it can be used readily not only with a user terminal at home but also with a user terminal at a home of an acquaintance or in a hotel, which is convenient to the user. Further, if a credit card is used, then the necessity for inputting of an account number for settlement can be eliminated, which further improves the convenience to the user.

The input/output interface 105 transfers an operation instruction from the CPU 101 to the modem 111. Further, the input/output interface 105 receives an instruction for change-over between the modem 111 and the telephone set 150 from the CPU 101. In the present embodiment, a modem having an automatic call origination function for calling the data base center 300 in response to an instruction of a telephone number from the outside (in this instance, the CPU 101) is used as the modem 111.

The television broadcasting reception unit 106 has, in addition to a function of receiving an analog television broadcasting signal and displaying an image on a display screen similarly as in an ordinary television receiver, another function of extracting guide information inserted in a blanking period of a television signal and a further function of displaying the thus extracted guide information and information received from the data base center 300 via the network 200.

The operation panel 107 is disposed on an outer face of the television broadcasting reception unit 106 and electrically connected to the common bus 110. The operation panel 107 includes a power supply switch, a volume switch, a ten key apparatus, control keys and so forth provided thereon. The ten key apparatus is used, in an ordinary mode of the user terminal 100, to select a channel of a broadcasting center, but used, in a communication mode of the user terminal 100, to input numerical value information. The control keys include keys for execution, stopping, cancellation and so forth to be used for execution and stopping of communication, cancellation of a numerical value inputted by the ten key apparatus and so forth, respectively.

The remote control signal reception circuit 108 receives an input signal transmitted by wireless from the remote controller 109. The remote controller 109 includes input switches similar to those of the operation panel 107 and transmits an input signal thereto by wireless.

Figure 5:
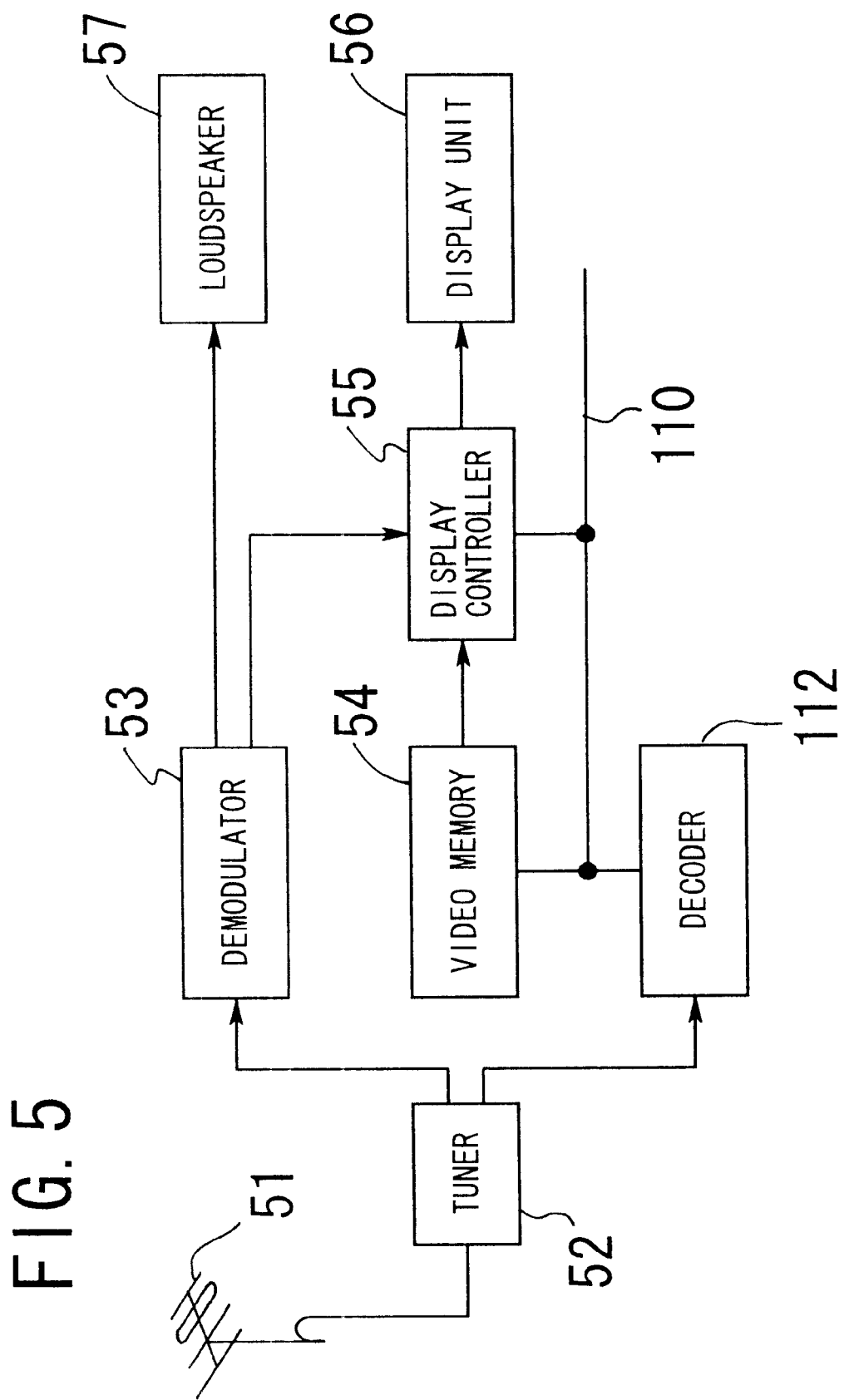
FIG. 5 is a block diagram showing a circuit construction of a television reception unit shown in FIG. 4.

FIG. 5 shows a circuit construction of the television broadcasting reception unit 106. Referring to FIG. 5, one of television signals received by the antenna 51 is selected by a tuner 52. The selected television signal is demodulated by a demodulator 53, composed with a window image stored in a video memory 54 under the control of a display controller 55 and displayed on the display unit 56.

A decoder 112 extracts and decodes guide information inserted in each blanking period of a television signal. Particularly, a decoder for teletext or an EDTV-II decoder can be used for the decoder 112. The video memory 54 can be accessed by the CPU 101 of FIG. 4. The guide information decoded by the decoder 112 is stored once into the RAM 103 in response to an instruction from the CPU 101. Thereafter, the CPU 101 writes the guide information in the form of character patterns together with information received from the data base center 300 into the video memory 54 so that the character information can be displayed in the screen of the window 113 of the display unit 56.

Figure 7:
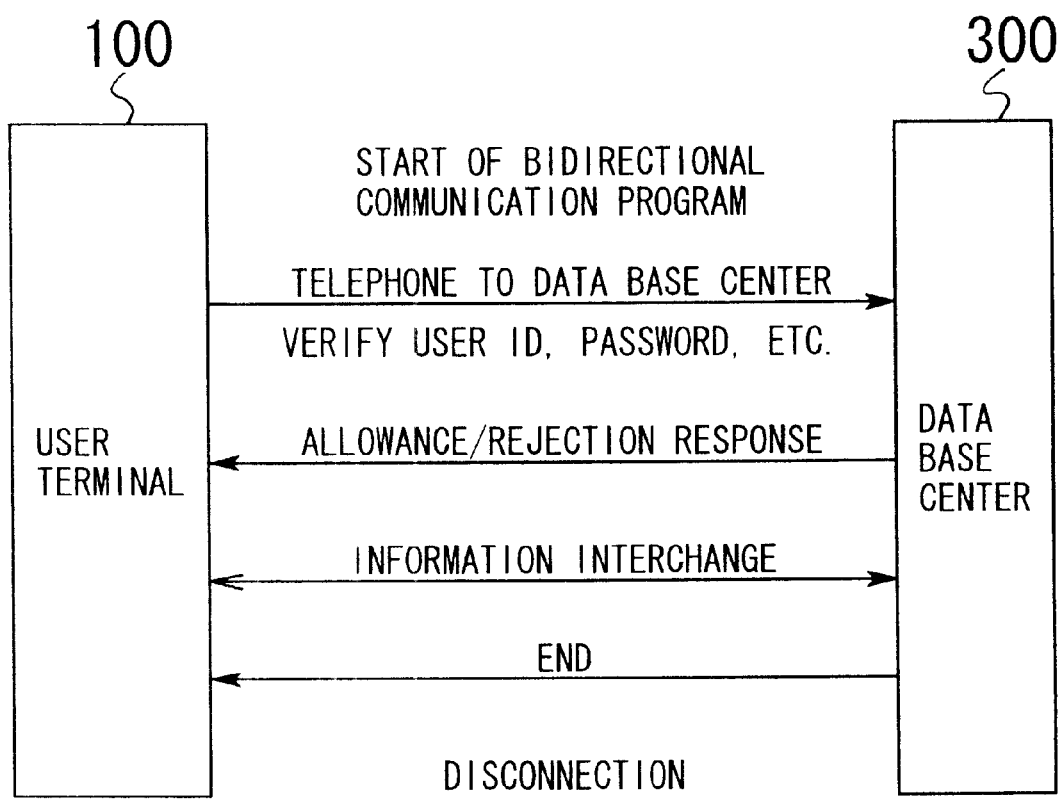
FIG. 7 is a sequence diagram illustrating a protocol procedure between the user terminal and the data base center in the information network system of FIG. 1.

In the user terminal 100 having the construction described above, if an ordinary mode is instructed from the operation panel 107 or the remote controller 109 of FIG. 3, then the CPU 101 sets an ordinary mode and then transfers an operation instruction inputted from the operation panel 107 or the remote controller 109 to the television broadcasting reception unit 106. On the other hand, if the CPU 101 receives an instruction of a communication mode, then it sets a communication mode and performs such a protocol procedure as illustrated in FIG. 7 to allow bidirectional communication between the user terminal 100 and the data base center 300.

Figure 6:
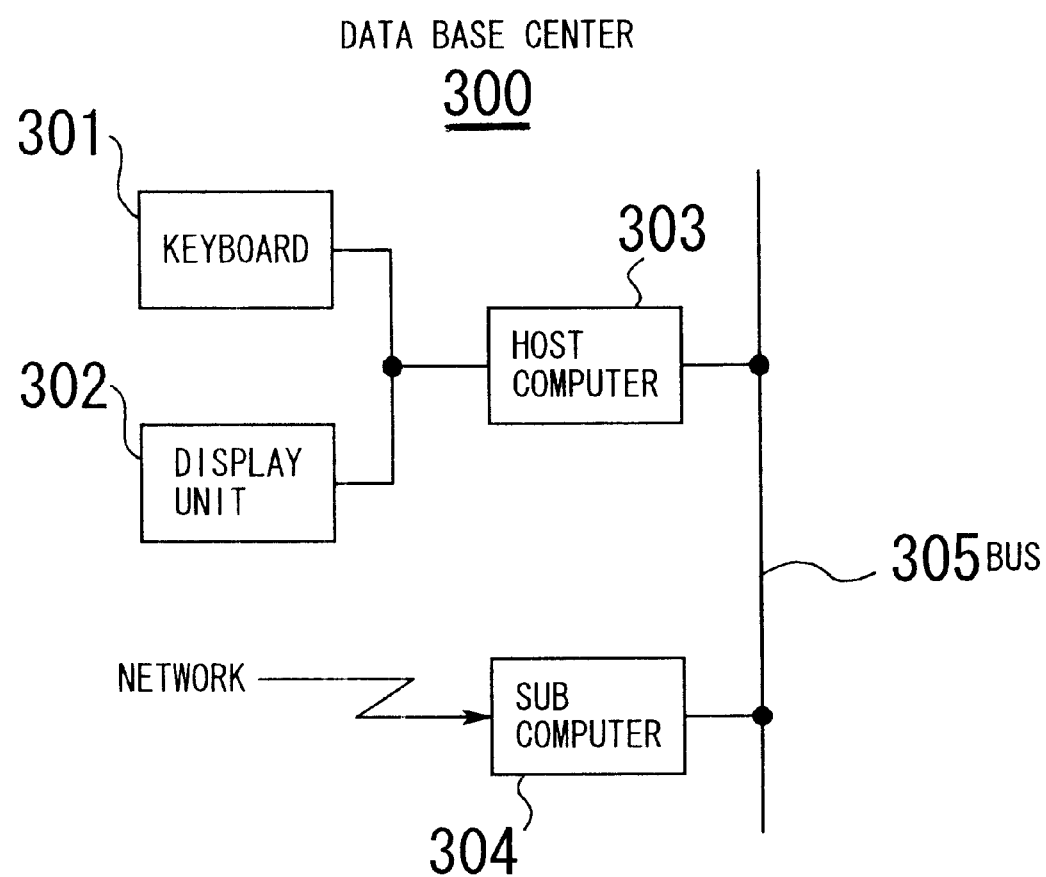
FIG. 6 is a block diagram showing a system construction of a data base center of the information network system of FIG. 1.

A system construction of the data base center 300 is shown in FIG. 6. Referring to FIG. 6, the data base center 300 includes a host computer 303 for storing and managing data bases, a keyboard 301 for inputting information to the host computer 303 therethrough, a display unit 302 for displaying information instructed from the host computer 303, and a sub computer 304 for connecting the data base center 300 to the network 200. The host computer 303 and the sub computer 304 are connected to each other by a bus 305. After bidirectional communication with a user terminal 100 is established, the sub computer 304 cooperates with the host computer 303 to perform information processing in accordance with a demand from the user terminal 100 and transmits response information obtained as a result of the information processing as a response to the user terminal 100. ID information corresponding to the guide information is registered in advance in the host computer 303. The host computer 303 receives ID information from the sub computer 304 via the bus 305 and performs verification of the ID information or processing for detection of particular ID information from within the received ID information.

Each of the user terminals 100 can be realized also by modifying an existing television receiver with a teletext reception function or a television receiver for the EDTV-II system so as to additionally have a network communication function or by adding program software for extraction of guide information and for network communication to a personal computer with a built-in television reception function. Also the antenna may be replaced by a cable for a CATV system. Further, also network communication and telephoning are possible with a bidirectional CATV system.

For the connection of the network 200 and the data base center 300, various forms are available including a form wherein a data base server is connected by the internet or by personal communication, another form which makes use of an ISDN line and a further form which makes use of a data base service of a telephone company. Further, the network 200 and the data base center 300 can be connected to each other via a bidirectional CATV system.

Figure 8:
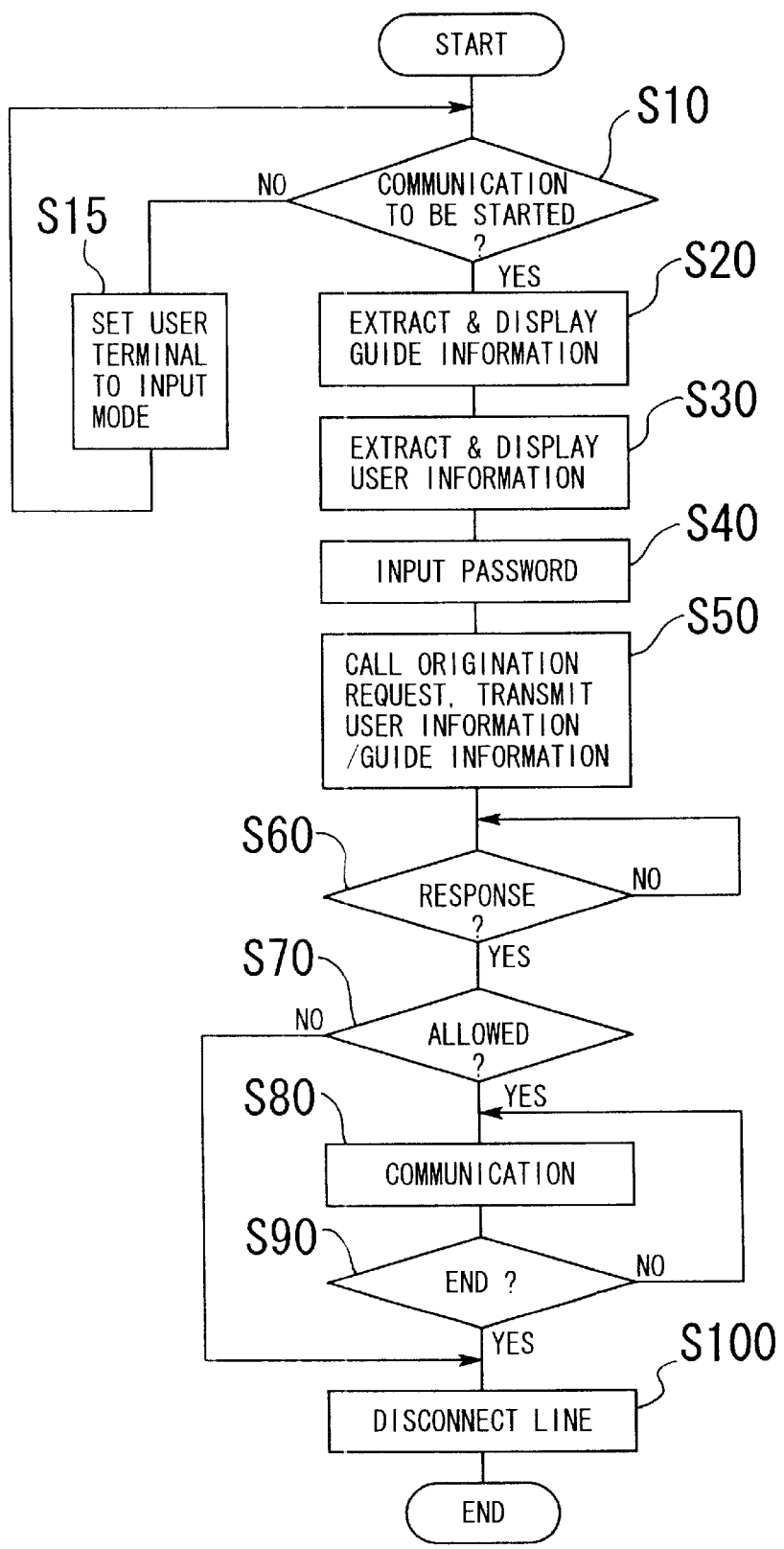
FIG. 8 is a flow chart illustrating a control procedure executed by a CPU shown in FIG. 4.
Figure 9:
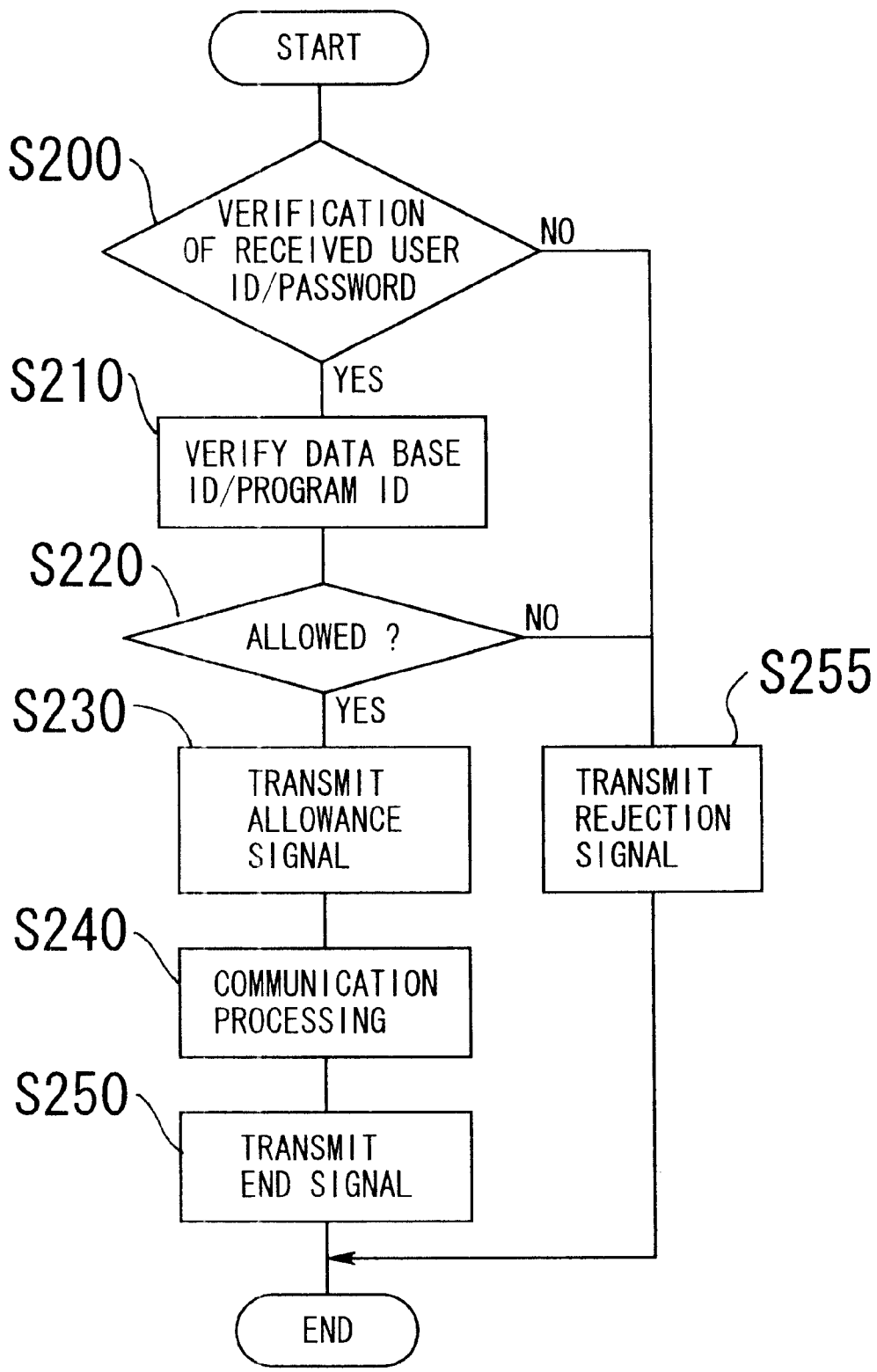
FIG. 9 is a flow chart illustrating processing executed by a sub computer shown in FIG. 6.

Information transmission processing performed in the system described above will be described subsequently with reference to the flow charts of FIGS. 8 and 9. The flow chart of FIG. 8 illustrates contents of a system program executed by the CPU 101 of FIG. 4. The system program is described in a program language in which the CPU 101 can execute the system program, and is stored in the ROM 102. The flow chart of FIG. 9 illustrates contents of a system program executed by the sub computer 304 of the data base center 300 of FIG. 6. Also this system program is described in the program language and stored in the sub computer 304. In FIGS. 8 and 9, the system programs are represented in functional representations for the convenience of illustration.

The information transmission processing described below relates to a case wherein, as an example, a user watches a shopping program received by a user terminal 100 and makes an application for shopping to the data base center 300 of an origin of sales.

The user terminal 100 is initialized to an ordinary mode when the power is made available. The user of the user terminal 100 will select a broadcasting program using the operation panel 107 or the remote controller 109. As a result, an image of a shopping program of the designated channel is displayed on the display unit 56. On the broadcasting center 400 side, an image which calls starting of a communication mode and another image indicating a telephone number of a destination for communication are inserted into a shopping program broadcast, and making use of each blanking period of the television signal, guide information including a broadcast program ID, a telephone number of the data base center, a data base server ID and so forth is sent out. For the method of using a blanking period, a method which utilizes a blanking period defined for teletext or another method which utilizes a blanking period defined for the EDTV-II system may be available.

The user will watch the image inserted in the shopping program and manually operate, for example, a running key, which is a particular control key, from the operation panel 107 or the remote controller 109 to designate a communication mode. The CPU 101 discriminates a value designated by the key to detect that a communication mode has been designated (discrimination of YES in step S10 of FIG. 8), and then executes a bidirectional communication program beginning with step S20. In particular, the CPU 101 stores guide information decoded by the decoder 112 once into the RAM 103, converts the guide information into character patterns and writes the character patterns into the video memory 54. Then, the CPU 101 controls the display controller 55 to open the window 113 as shown in FIG. 3 and display a message of the guide information in the window 113 (step S20 of FIG. 8). An example of the screen in this instance is shown in FIG. 10(*a*). In the example shown, the broadcasting program ID, the telephone number of the data base center 300 and the data base server ID (in the case of the internet, URL) are displayed.

It is to be noted that the message may otherwise be displayed in a superimposed relationship with the image signal without opening the window 113 or else both of the window 113 and such superimposed display may be used.

Subsequently, the CPU 101 reads out the user information stored in the user information storage memory 104 and reads out a message (code train) for calling inputting of a password from the ROM 102, converts the message into character patterns and writes the character patterns into the video memory 54 so that the message is displayed on the display unit 56 together with the user information read out from the user information storage memory 104 (step S30 of FIG. 8). Looking at the display of the message, the user will input the password of the user itself using the ten key apparatus of the operation panel 107 or the remote controller 109 (step S40 of FIG. 8). An example of the screen in this instance is shown in FIG. 10(*b*). In FIG. 10(*b*), the symbol **\*\*\*\*** represents the password.

Then, the user will manually operate the running key of the operation panel 107 or the remote controller 109 to input an instruction to start communication. The CPU 101 thus forwards a call origination instruction to the modem 111 via the input/output interface 105. Consequently, the modem 111 connects the user terminal 100 to the network 200 using its automatic dialing function. Further, the CPU 101 calls, by its automatic log-in function, the sub computer 304 of the data base center 300 and transmits the user information and the guide information to the sub computer 304 (step S50 of FIG. 8). Thereafter, the user terminal 100 waits for a response from the sub computer 304 (loop processing of step S60 of FIG. 8).

Meanwhile, the sub computer 304 of the data base center 300 performs, when it receives the user ID and the password in accordance with the call origination from the user terminal 100, verifies them to determine whether or not they are ones registered in advance, and if a result of the verification reveals that the user ID has not been registered as yet or the received password is different from the registered password, the sub computer 304 transmits a rejection signal indicative of rejection of later communication as a response to the user terminal 100 (steps S200 to S225 of FIG. 9).

If the result of the verification proves that the user ID is the same as the registered user ID, the sub computer 304 transfers the data base server ID and the broadcasting program ID to the host computer 303, and then the host computer 303 verifies them to determine whether or not they are the same as those prepared by the broadcasting program in advance. If a result of the verification exhibits some incoincidence, then the sub computer 304 transmits a communication rejection signal to the user terminal 100 (steps S210 to S220 and further to S225 of FIG. 9). If the result of the verification proves full coincidence, the sub computer 304 performs predetermined communication with the host computer 303 and the user terminal 100 (steps S220 to S230 and further to S240 of FIG. 9). After the predetermined communication is completed, the sub computer 304 transmits an end signal, thereby ending the control procedure of FIG. 9 (step S250 of FIG. 9).

Where the internet is utilized, the sub computer 304 of FIG. 6 serves as a gateway processor; the host computer 303 serves as a data base server; and the bus 305 serves as an internal network.

Referring back to FIG. 8, when the CPU 101 of the user terminal 100 receives an allowance/rejection signal from the sub computer 304 via the modem 111 (step S60 of FIG. 8), if the signal represents rejection of communication, the control sequence advances to step S100, in which the CPU 101 delivers an instruction to the modem 111 to disconnect the network 200 (steps S70 to S100 of FIG. 8). On the contrary, if the received signal represents allowance of communication, the CPU 101 performs communication with the sub computer 304 and writes communication information transmitted thereto from the sub computer 304 into the video memory 54 so that the communication information is displayed on the display unit 56. Further, the CPU 101 transmits numerical value information inputted thereto from the ten key apparatus of the operation panel 107 or the remote controller 109 such as, for example, a designation of a commodity or a color, a designation of a method of payment and a credit number to the sub computer 304 via the modem 111 (steps S70 to S80 of FIG. 8). Further, the CPU 101 transmits the numerical value information inputted thereto to the display unit 56 via the video memory 54 so that the numerical value information may be displayed on the display unit 56. If a wrong numerical value is inputted by wrong operation of the ten key apparatus, the inputted value may be cancelled using the cancel key. An example of the screen of communication information is shown in FIG. 10(c). In FIG. 10(c), a digit or digits in any rectangular frame represent a numerical value or values inputted using the ten key apparatus. It is to be noted that the password or the credit number mentioned above is communicated by cryptographic communication in order to assure security.

Thereafter, the CPU 101 operates as a communication control circuit and performs transmission and communication control of information until after an end signal is received from the sub computer 304. Further, the CPU 101 displays information received from the sub computer 304 on the display unit 56 (loop processing in steps S80 to S90 of FIG. 8). When an end signal is received, the CPU 101 disconnects the network 200, thereby ending the procedure described above (step S100). It is to be noted that, though not illustrated in the flow charts of FIGS. 8 and 9, if a stopping control key provided on the operation panel 107 or the remote controller 109 is manually operated, then the communication control procedure can be ended at any time.

While an ordinary television receiver is used the user terminals 100 shown in FIGS. 2 to 5, if a television reception function and a personal computer with a built-in modem are available, then a user terminal having the functions described above can be realized readily with program application software for a personal computer. For example, in FIG. 4, the CPU 101, ROM 102, RAM 103, user information storage memory 104, input/output interface 105, modem 111 and operation panel 107 can be replaced by a personal computer with a built-in modem and program software. Further, those functions may be replaced also by a game machine with a built-in modem. Further, if a personal computer with a built-in modem having a television reception function or a game machine with a built-in modem having a television reception function is used, also the tuner 52, the demodulator 53, a loudspeaker 57, the video memory 54, the display controller 55 and the display unit 56 of FIG. 5 can be replaced in addition to the elements mentioned above. In this instance, however, a construction which can be controlled by the CPU to extract and decode guide information inserted in a blanking period of a television signal is required. Further, a control apparatus which has extracting and decoding functions of guide information, an information inputting function, a function of a modem and a communication controlling function may be constructed separately from a body of a television receiver and connected and used as an adapter for the television receiver body.

Further, while, in the present embodiment, guide information is inserted in a blanking period of a television signal, it is otherwise possible to insert guide information in such a form that it is displayed together with an image of a broadcasting program on the display unit 56 and extract and decode the guide information by image processing from the received image. In this instance, however, an image decoding processing construction is required.

Further, while the information network system and the broadcasting receiving user terminal according to the present invention are described in connection with a shopping program, they can be utilized otherwise for answering to a quiz of a quiz program from viewers, for voting for results of examination or popularity voting from viewers on a program for songs or entertainments, for questionnaire on a news or a debate, for forecasting of victory or defeat or a score of a sport program and so forth.

Figure 11:
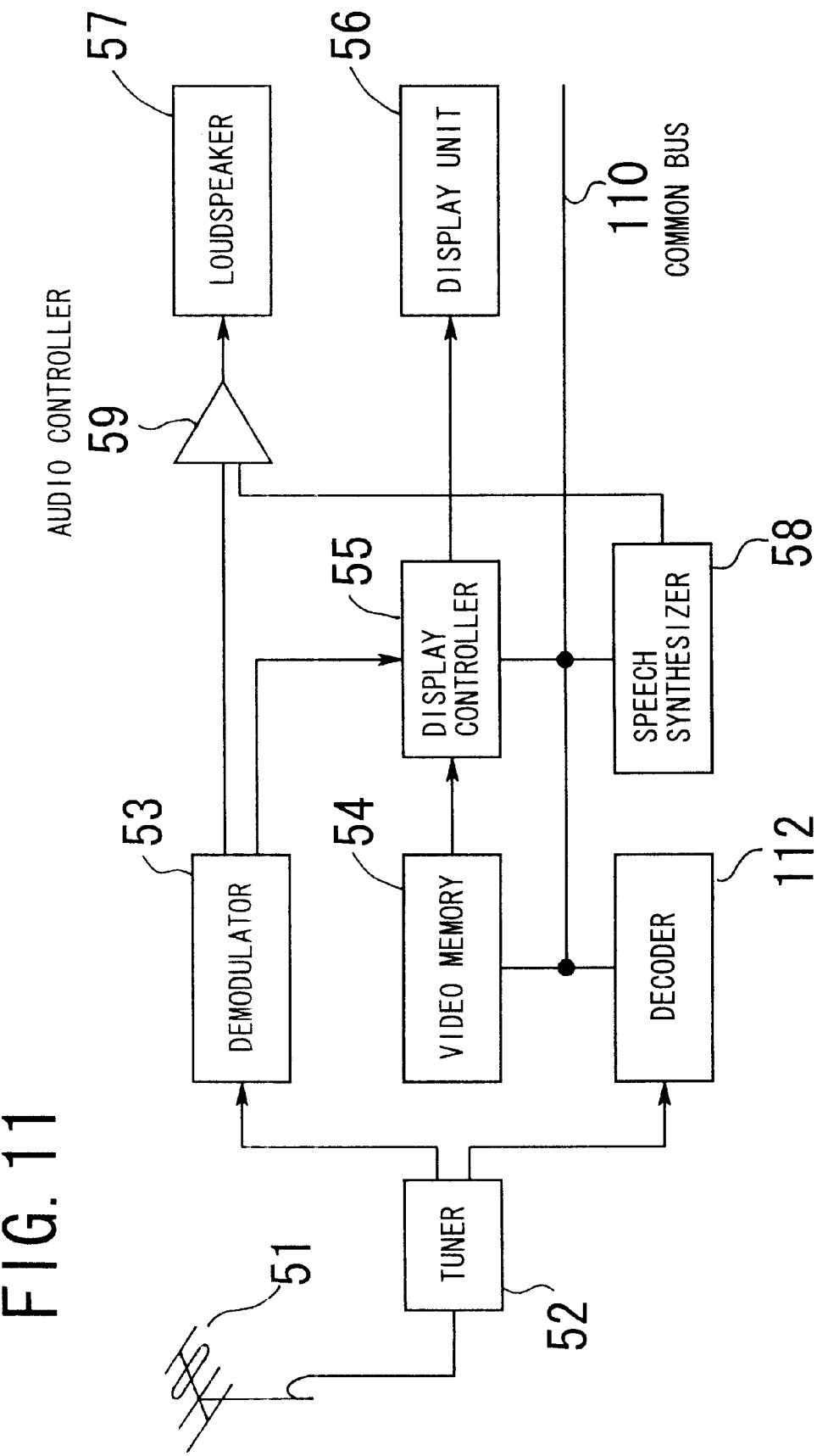
FIG. 11 is a block diagram showing a modification to the television reception unit of FIG. 5 which has an additional function of notifying guide information also by sound.

FIG. 11 shows another from of the user terminal 100. Referring to FIG. 11, the user terminal 100 is a modification to the user terminal 100 described hereinabove with reference to FIG. 5 and has, in addition to the function of displaying communication information from the data base center 300 on a screen, another function of outputting the communication information by sound. In particular, communication information from the data base center 300 is sent from the common bus 110 to a speech synthesizer 58, by which it is converted into an audio signal. Then, the audio signal is synthesized with sound of a television signal by an audio controller 59 and outputted as sound from a loudspeaker 57. The audio controller 59 can be selectively switched from the mode in which the audio signal is synthesized with the sound of the television signal to another mode in which either the audio signal or the sound of the television signal is outputted as sound.

Figure 12:
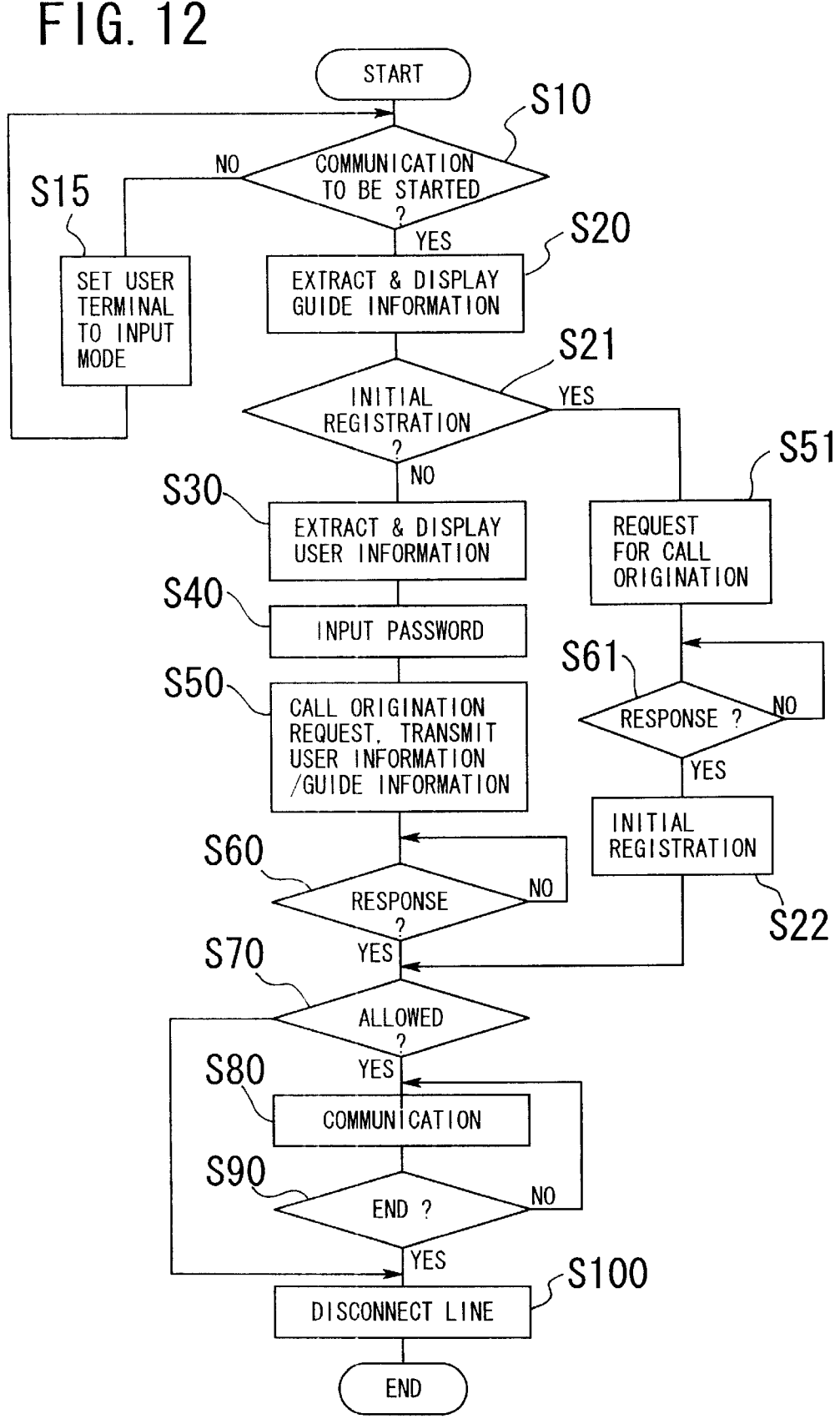
FIG. 12 is a flow chart illustrating a modification to the processing illustrated in FIG. 8 which additionally has an initial registration function for user information.
Figure 13:
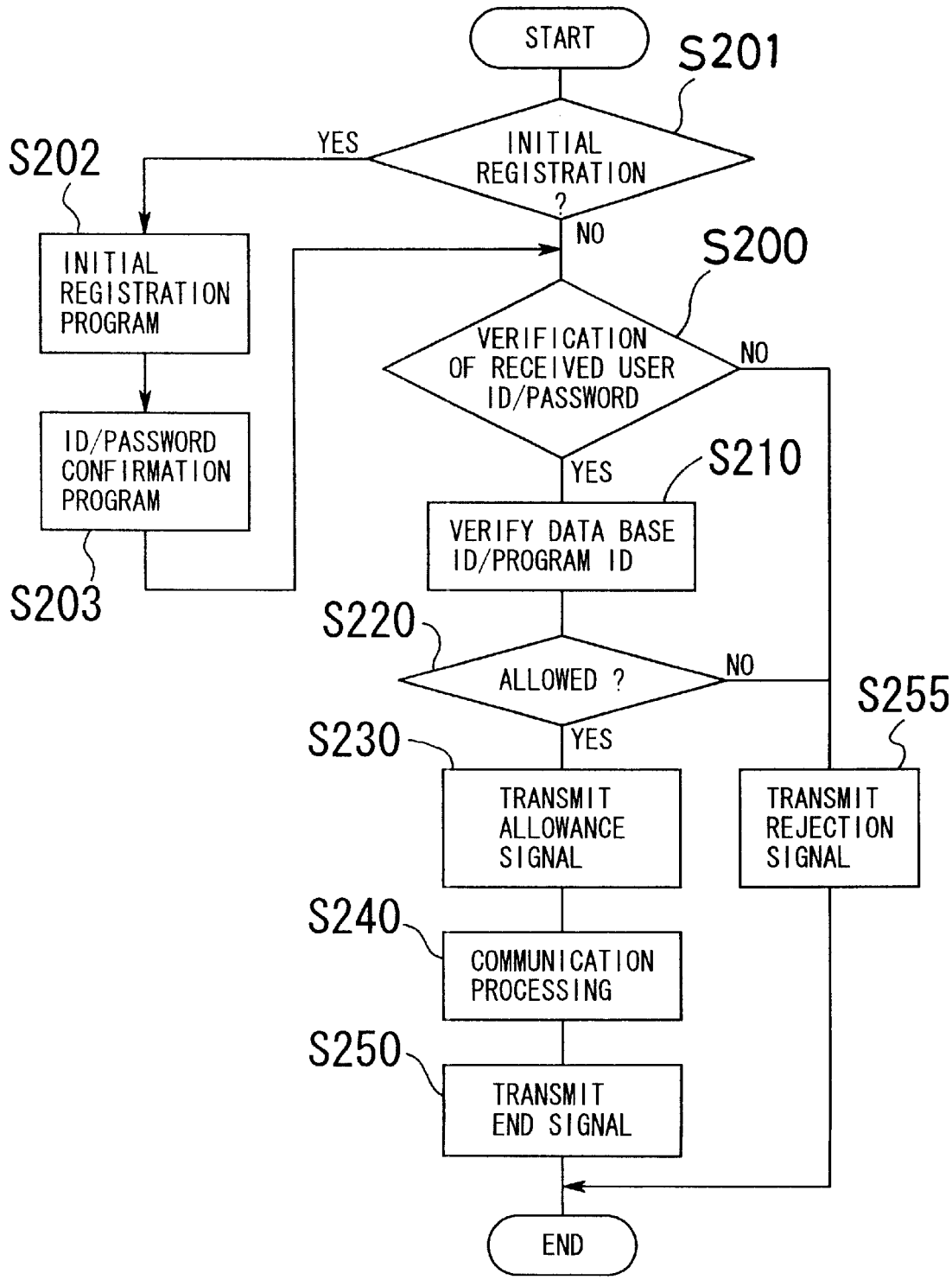
FIG. 13 is a flow chart illustrating a modification to the processing illustrated in FIG. 9 which additionally has a initial registration function for user information.

While the procedures illustrated in FIGS. 8 and 9 relate to a case wherein communication is not established if a user ID is not registered in advance in the data base center 300, it is preferable to make it possible for a non-registered user to have its ID to be registered readily by a simple procedure. FIGS. 12 and 13 illustrate flow charts of communication control by a user terminal and the data base center 300, respectively, wherein a function of registering an ID of a non-registered user is additionally provided. In this instance, FIGS. 8 and 9 correspond to FIGS. 12 and 13, respectively, and each same function is represented by a same step number.

Referring first to FIG. 12, when a communication mode is set and then guide information is extracted and displayed, the user terminal discriminates whether or not initial registration should be performed (step S21 of FIG. 12). While it may be selectively determined by a user whether or not initial registration should be performed, it may otherwise be discriminated automatically by the system. When initial registration should not be performed, the user terminal thereafter operates in a similar manner as described hereinabove with reference to FIG. 8. On the contrary when initial registration should be performed, the user terminal develops a call origination request to the network 200 and performs initial registration of the user ID in accordance with the guidance for initial registration provided by the network 200 (steps S61 to S22 of FIG. 12), whereafter the user terminal enters an ordinary communication mode. Communication control on the data base center 300 side corresponding to this is illustrated in FIG. 13. As seen from FIG. 13, the procedure illustrated is the same as that in FIG. 9 except initial registration. In particular, referring to FIG. 13, if a request for initial registration is received from a user, an initial registration program starts similarly as in on-line registration of personal computer communication (step S202) to urge the user for registration. Then, after the registration is completed, the data base center 300 causes the user to confirm the user ID and the password, and if they are confirmed by the user, the data base center 300 enters an ordinary communication mode. Thereafter, the data base center 300 stars an ID/password confirmation program to confirm credit information such as a credit number in order to eliminate registration of an illegal user (step S203 of FIG. 23).

Subsequently, the user terminal 100 where it is applied to digital television broadcasting such as digital satellite broadcasting, digital ground wave broadcasting or digital cable broadcasting will be described.

In this instance, the user terminal 100 serves as a user terminal for reception of digital television broadcasting, and the broadcasting center 400 multiplexes guide information into part of a digital television signal. For the multiplexing method, part of the seventh, sixth and fifth layers of the layer model of digital broadcasting explained in "Basic Technology of Digital Television Broadcasting", *Journal of the Television Society of Japan*, Vol. 48, No. 1, 1994, pp.57–64 and Vol. 49, No. 2, 1994, pp.164–170 may be utilized. In particular, an interactive operation for provision of guide information is defined by the seventh layer which defines an application and the guide information is actually coded by the sixth layer which defines the presentation, and then the guide information is multiplexed with video and audio information into a data train by the fifth layer which defines the session to allow identification, distribution and division into groups of data.

The amount of information allocated to one channel in digital television broadcasting is approximately 3 to 6 Mb/s. If 0.1% of the data is assured for an interactive operation other than for an image and sound defined by the application layer, then it is possible to transmit data of 3 to 6 kb/s. Since a program continues for 15 seconds at the shortest, data of 4,500 to 9,000 bits can be transmitted within the period of 15 seconds, and accordingly, guide information can be transmitted sufficiently including an error correction function.

Figure 14:
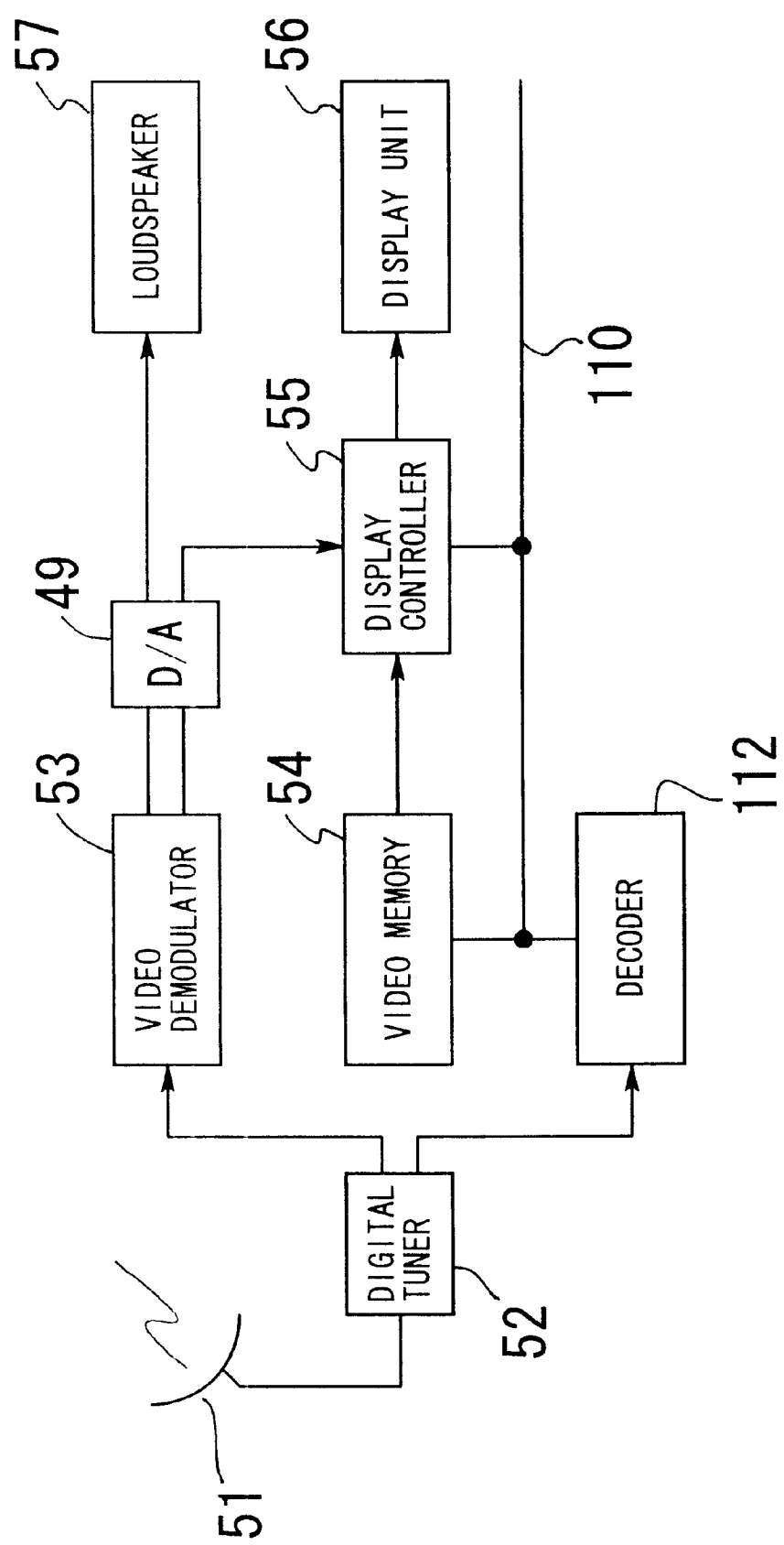
FIG. 14 is a block diagram showing an example of a television reception unit for digital television broadcasting.

In the user terminal 100 for reception of digital television broadcasting, the television broadcasting reception unit 106 shown in FIG. 4 has such a circuit construction as shown in FIG. 14 instead of the circuit construction of FIG. 5. Referring to FIG. 14, the television broadcasting reception unit 106 shown is a modification to the television broadcasting reception unit 106 described hereinabove with reference to FIG. 5, and one of digital television signals received by the antenna 51 is selected by the tuner 52. The selected digital television signal is decoded by the demodulator 53, converted into an analog video signal by a digital to analog converter (D/A) 49, composed with a window image stored in the video memory 54 under the control of the display controller 55 and displayed on the display unit 56. The decoder 112 extracts and decodes guide information transmitted in a multiplexed condition with the television signal.

Figure 15:
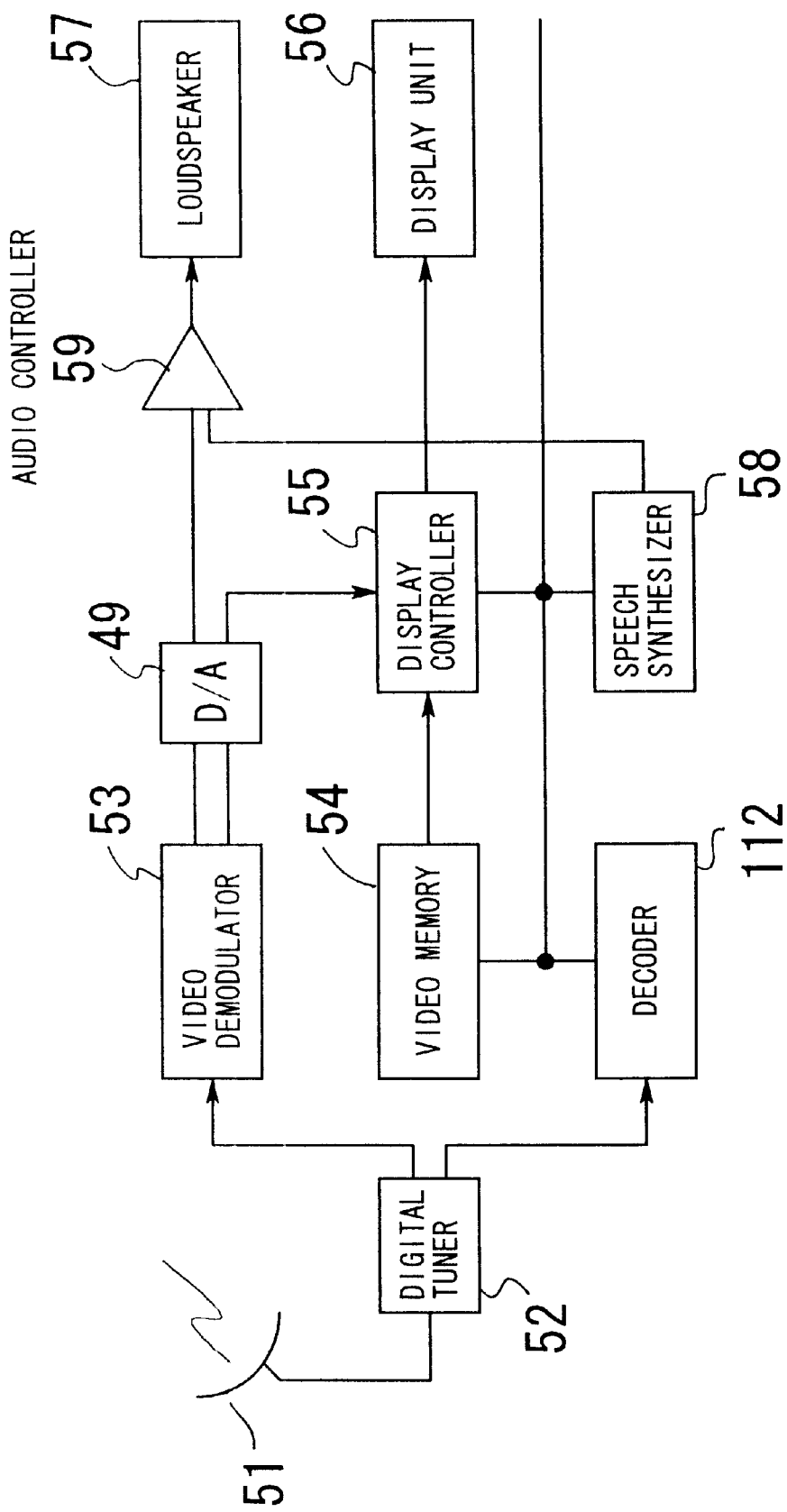
FIG. 15 is a modification to the television reception unit of FIG. 14 wherein guide information is additionally notified also by sound.

FIG. 15 is a modification to the modified circuit construction of the television broadcasting reception unit 106 shown in FIG. 14. The modified circuit construction of FIG. 15 additionally has a function of outputting communication information from the data base center 300 also by sound.

Subsequently, an application to analog radio broadcasting will be described.

In this instance, each of the user terminals 100 of the information network system of FIG. 1 serves as a user terminal for reception of analog radio broadcasting, and the broadcasting center 400 transmits guide information in synchronism with a particular radio broadcasting program. For the transmission, a data channel for FM teletext defined in the Order No. 30 of the Ministry of Posts and Telecommunications of Japan issued on Apr. 28, 1994 may be used. In particular, when a program for shopping, a quiz or questionnaire is broadcast, guide information of a data base center for which a response is to be destined is broadcast in synchronism with the program broadcasting making use of the data channel. As another method for multiplexing data to be transmitted with FM radio broadcasting, the RDS (Radio-Data System) developed in Europe and disclosed in *EBU REVIEW TECHNICAL*, No. 200, August 1983, pp.186–192 or the SCA (Subsidiary Communications Authorization) developed in the United States and disclosed in *IEEE TRANSACTIONS ON BROADCASTING*, Vol. BC-27, No. 4, December 1981, pp.65–70 may be used.

Figure 16:
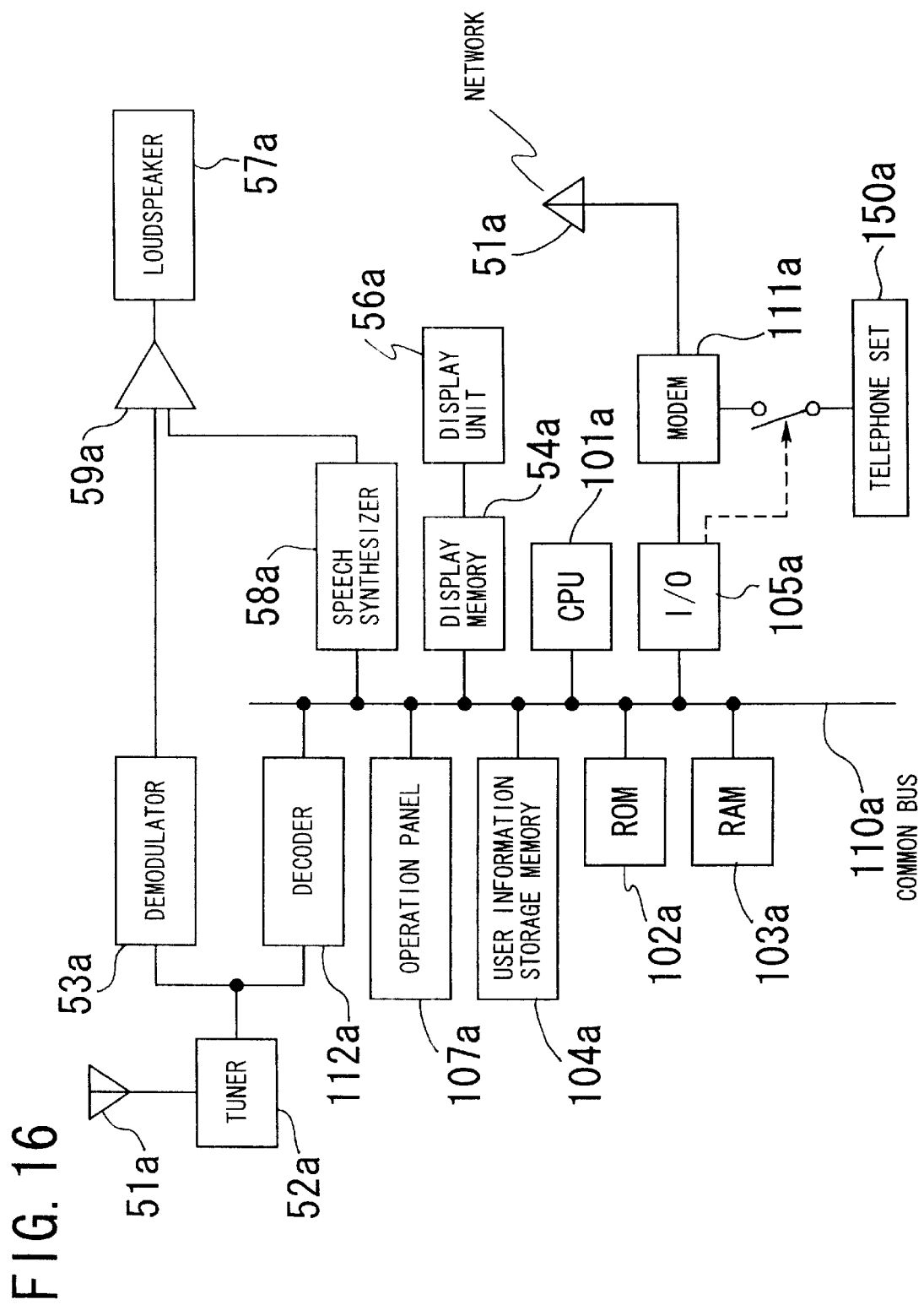
FIG. 16 is a block diagram showing an example of a user terminal for analog radio broadcasting.

FIG. 16 shows a form of a user terminal for reception of analog radio broadcasting. Referring to FIG. 16, components similar to those of FIGS. 4, 5 and 11 are denoted by same reference numerals with a suffix a added thereto. When the user terminal shown is in an ordinary mode, analog radio broadcasting signals are caught by an antenna 51a, and an analog radio broadcasting signal of a channel is selected by a tuner 52a. The selected analog audio broadcasting signal is demodulated into an audio signal by a demodulator 53a, and the audio signal is outputted as sound from a loudspeaker 57a. On the other hand, when the user terminal is in a communication mode, guide information transmitted in synchronism with a radio program is extracted and decoded from the data channel by a decoder 112a, and is passed on by a common bus 110a to a display memory 54a and then displayed on a display unit 56a under the control of a CPU 101a. For the display unit 56a, a display unit of a small size of the low power consumption type for displaying characters such as, for example, a liquid crystal display, is suitably used. After the guide information is confirmed, information communication with the data base center 300 is performed in a similar manner to that when television broadcasting is received. However, since it is considered that, since, as a form in which a radio is used, it is often used with a traveling car like a car-carried radio, it is illustrated in FIG. 16 that communication from a modem 111a to a network is performed through a radio antenna 51b. Naturally, the communication may be performed alternatively using a cable. Further, a speech synthesizer 58a and an audio controller 59a have similar functions to those described hereinabove with reference to FIG. 11.

The user terminal for reception of radio broadcasting shown in FIG. 16 can be realized by a combination of techniques for a car-carried radio with a data broadcast reception function and a car-carried telephone. In particular, the antenna 51a, tuner 52a, demodulator 53a and loudspeaker 57a provide an ordinary radio reception function while the decoder 112a, display memory 54a, display unit 56a, CPU 101a, ROM 102a and RAM 103a are included in a data broadcasting receiver. Further, an operation panel 107a, a transmitter/receiver 105a and the radio antenna 51b are incorporated in a car-carried telephone. Accordingly, the user terminal described above can be realized by adding the modem 11a and a user information storage memory 104a to those elements or functions. Further, since also a car navigation apparatus has several elements which can be used commonly such as a display unit and a CPU, the user terminal may be combined with a car navigation apparatus. Further, similarly as in reception of television broadcasting, a removable magnetic recording card, an optically recording card, an IC card or a credit card can be used conveniently as the user information storage memory. Further, similarly as in television broadcasting described above, realization of communication control with the data base center 300 by automatic dialing and automatic log-in and employment of cryptographic communication for communication of a password or a credit number increase the value of utilization of the user terminal for reception of radio broadcasting.

Subsequently, an application to digital radio broadcasting will be described.

In this instance, each of the user terminals 100 serves as s user terminal for reception of digital radio broadcasting, and the broadcasting center 400 multiplexes and transmits guide information with a digital radio signal of a particular radio broadcasting program.

Figure 17:
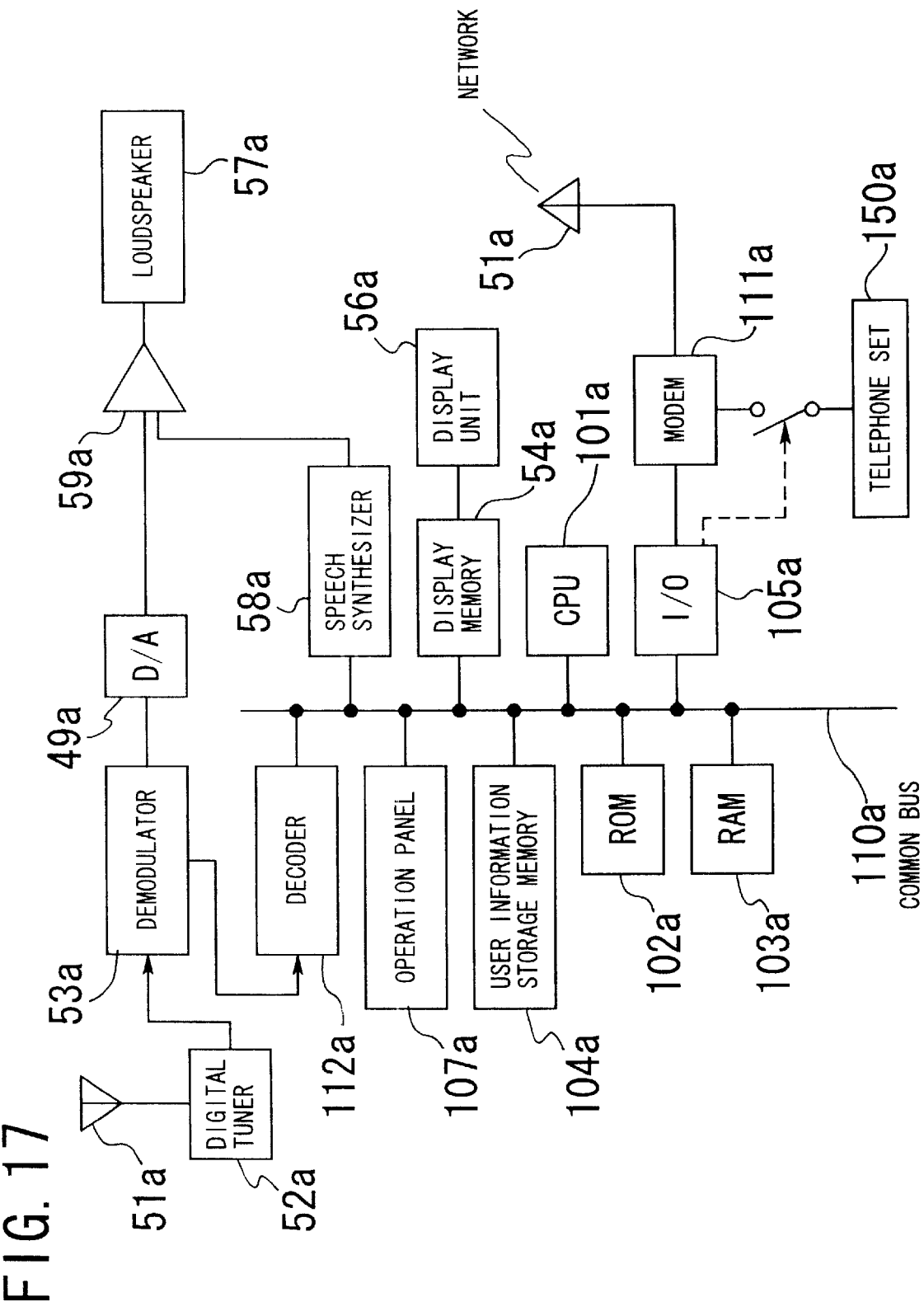
FIG. 17 is a block diagram showing an example of a user terminal for digital radio broadcasting.

A form of the user terminal for reception of digital radio broadcasting is shown in FIG. 17. Referring to FIG. 17, the user terminal shown can be regarded as a modification to the user terminal shown in FIG. 16, and when the user terminal is in an ordinary mode, digital broadcasting signals are caught by an antenna 51a and a digital broadcasting signal of a channel is selected by the tuner 52a. Then, an audio signal of the selected digital broadcasting signal is decoded by the audio demodulator 53a, converted into an analog audio signal by a digital to analog converter (D/A) 49a and outputted as sound from the loudspeaker 57a. On the other hand, when the user terminal is in a communication mode, guide information transmitted in a multiplexed condition with a radio program is extracted and decoded by the decoder 112a, and is passed on by the common bus 110a to the display memory 54a and then displayed on the display unit 56a under the control of the CPU 101a. After the guide information is confirmed, information communication with the data base center 300 is performed in a similar manner to that when a television broadcast is received.

Having now fully described the invention, it will be apparent to one of ordinary skill in the art that many changes and modifications can be made thereto without departing from the spirit and scope of the invention as set forth herein.

What is claimed is:

1. An information network system, comprising:
    a broadcasting center for transmitting a broadcasting signal;
    a user terminal for receiving the broadcasting signal from said broadcasting center;
    a data base center connected to said user terminal by the internet;
    a network connecting said user terminal and said data base center for bidirectional communications;
    guide information addition means provided in said broadcasting center for multiplexing data base accessing guide information which includes a universal resource locator (URL) for a data base center into the broadcasting signal for a program to be transmitted;
    guide information extraction means provided in said user terminal for extracting the guide information including the URL from the broadcasting signal received by said user terminal so that a user of said user terminal may be informed of the URL by said user terminal;
    first network communication means provided in said user terminal for accessing the data base defined by said URL and for receiving a response from said data base center; and
    second network communication means provided in said data base center for confirming the guide information and the user information transmitted thereto from said user terminal via said network and then establishing bidirectional communication with said user terminal.

2. An information network system as claimed in claim 1, wherein said broadcasting center and said user terminal are connected to each other by a bidirectional cable network.

3. An information network system as claimed in claim 1, wherein the broadcasting signal from said broadcasting center is an analog television broadcasting signal and said guide information addition means inserts the guide information into a blanking period of a television video signal of the analog television broadcasting signal, and said user terminal is a user terminal for receiving the analog television broadcasting signal and said guide information extraction means in said user terminal extracts the guide information from the blanking period of the television signal received by said user terminal.

4. An information network system as claimed in claim 1, wherein the broadcasting signal from said broadcasting center is a digital television broadcasting signal and said guide information addition means superimposes the guide information with the digital television broadcasting signal, and said user terminal is a user terminal for receiving the digital television broadcasting signal and said guide information extraction means in said user terminal extracts and decodes the guide information from the digital television broadcasting signal received by said user terminal.

5. An information network system as claimed in claim 1, wherein the broadcasting signal from said broadcasting center is an analog radio broadcasting signal and said guide information addition means transmits the guide information in synchronism with the analog radio broadcasting signal, and said user terminal is a user terminal for receiving the analog radio broadcasting signal and said guide information extraction means in said user terminal extracts the guide information in synchronism with the analog radio broadcasting signal received by said user terminal.

6. An information network system as claimed in claim 1, wherein the broadcasting signal from said broadcasting center is a digital radio broadcasting signal and said guide information addition means multiplexes the guide information with the digital radio broadcasting signal, and said user terminal is a user terminal for receiving the digital radio broadcasting signal and said guide information extraction means in said user terminal extracts the guide information from the digital radio broadcasting signal received by said user terminal.

7. An information network system as claimed in claim 1, wherein the guide information includes information for allowing automatic dialing and automatic log-in to said data base center.

8. An information network system as claimed in claim 1, wherein the guide information further includes information for identification of a program from said broadcasting center.

9. A broadcasting receiving user terminal for receiving a broadcasting signal from a broadcasting center, comprising:
    guide information extraction means for extracting, from the broadcasting signal received by said user terminal, data base accessing guide information which includes a universal resource locator for a data base center added to the broadcasting signal for a program;
    storage means for storing user information peculiar to a user of said user terminal; and
    network communication means for transmitting the user information read out from said storage means and the data base accessing information obtained from the guide information extracted by said guide information extraction means to a data base center via the internet and for receiving a response from said data base center.

10. A broadcasting receiving user terminal as claimed in claim 9, wherein said user terminal is an analog television signal receiving user terminal for receiving an analog television broadcasting signal from said broadcasting center and said guide information extraction means extracts the guide information from a blanking period of the analog television broadcasting signal received by said user terminal.

11. A broadcasting receiving user terminal as claimed in claim 9, wherein said user terminal is a digital television broadcasting signal receiving user terminal for receiving a digital television broadcasting signal from said broadcasting center and said guide information extraction means extracts and decodes the guide information from the digital television broadcasting signal received by said user terminal.

12. A broadcasting receiving user terminal as claimed in claim 9, wherein said user terminal is an analog radio broadcasting signal receiving user terminal for receiving an analog radio broadcasting signal from said broadcasting center and said guide information extraction means extracts the guide information in synchronism with the analog radio broadcasting signal received by said user terminal.

13. A broadcasting receiving user terminal as claimed in claim 9, wherein said user terminal is a digital radio broadcasting signal receiving user terminal for receiving a digital radio broadcasting signal from said broadcasting station and said guide information extraction means extracts the guide information from the digital radio broadcasting signal received by said user terminal.

14. A broadcasting receiving user terminal as claimed in claim 9, wherein the guide information includes information for allowing automatic dialing and automatic log-in to said data base center.

15. A broadcasting receiving user terminal as claimed in claim 9, wherein the guide information further includes information for identification of a program from said broadcasting center.

* * * * *